(12) United States Patent
Jacquemin et al.

(10) Patent No.: US 10,261,228 B2
(45) Date of Patent: Apr. 16, 2019

(54) VEHICLE LIGHTING DEVICE WITH OPTICAL WAVEGUIDES

(71) Applicant: Valeo Iluminacion, Martos (ES)

(72) Inventors: Paul Jacquemin, Paris (FR);
Alexandre Chotard, Martos (ES);
Irene Molina, Luque Cordoba (ES);
Antonio Ortega, Martos (ES)

(73) Assignee: VALEO ILUMINACION, Martos (ES)

( * ) Notice: Subject to any disclaimer, the term of this patent is extended or adjusted under 35 U.S.C. 154(b) by 80 days.

(21) Appl. No.: 15/066,735

(22) Filed: Mar. 10, 2016

(65) Prior Publication Data

US 2016/0265732 A1  Sep. 15, 2016

(30) Foreign Application Priority Data

Mar. 13, 2015 (FR) ...................... 15 52071

(51) Int. Cl.
*F21V 8/00* (2006.01)
*G02B 6/00* (2006.01)
(Continued)

(52) U.S. Cl.
CPC ............... *G02B 6/00* (2013.01); *F21S 41/24* (2018.01); *F21S 41/29* (2018.01); *F21S 41/43* (2018.01); *F21S 41/663* (2018.01); *F21S 43/237* (2018.01); *F21S 43/241* (2018.01); *F21S 43/243* (2018.01); *F21S 43/249* (2018.01);
(Continued)

(58) Field of Classification Search
CPC ...... G02B 6/0075; G02B 6/0078; B60Q 3/62; B60Q 3/64; F21S 48/1241; F21S 48/2225; F21S 48/2231; F21S 48/2243; F21S 48/2275; F21S 48/2287
See application file for complete search history.

(56) References Cited

U.S. PATENT DOCUMENTS 4,389,698 A * 6/1983 Cibie .................. G02B 6/0005
                                                    362/338
4,544,259 A * 10/1985 Kanaoka .............. G02B 6/4249
                                                     346/46

(Continued)

FOREIGN PATENT DOCUMENTS

| DE | 102011050062 | 11/2012 |
|----|--------------|---------|
| EP | 1903274 | 3/2008 |
| EP | 2743567 | 6/2014 |

*Primary Examiner* — Ismael Negron
(74) *Attorney, Agent, or Firm* — Oblon, McClelland, Maier & Neustadt, L.L.P.

(57) ABSTRACT

A lighting device includes a series of optical waveguides, each optical waveguide being adapted to guide light rays between an entry face and an exit face, the optical waveguides being formed of a first subassembly and a second subassembly produced separately and each including a portion of the series of optical waveguides and including structural elements to retain the optical waveguides in position. The first subassembly and the second subassembly are adapted to be assembled to form the lighting device by cooperation of the structural elements, and the first subassembly includes a first structural element adapted to connect proximal ends of the optical waveguides and a second structural element distinct from the first structural element and adapted to connect distal ends of the optical waveguides.

15 Claims, 3 Drawing Sheets

(51) Int. Cl.
  *F21S 41/29* (2018.01)
  *F21S 41/24* (2018.01)
  *F21S 41/43* (2018.01)
  *F21S 41/663* (2018.01)
  *F21S 43/27* (2018.01)
  *F21S 43/237* (2018.01)
  *F21S 43/241* (2018.01)
  *F21S 43/243* (2018.01)
  *F21S 43/249* (2018.01)

(52) U.S. Cl.
  CPC ............ *F21S 43/27* (2018.01); *G02B 6/0028* (2013.01); *G02B 6/0068* (2013.01)

(56) References Cited

U.S. PATENT DOCUMENTS

| | | | | |
|---|---|---|---|---|
| 4,800,466 A * | 1/1989 | Bauer | .................. | B60H 1/0065 |
| | | | | 362/23.15 |
| 5,184,883 A * | 2/1993 | Finch | .................. | B60Q 1/0011 |
| | | | | 362/321 |
| 5,613,750 A * | 3/1997 | Roe | .................. | G01D 11/28 |
| | | | | 362/223 |
| 5,931,576 A * | 8/1999 | Kreysar | .............. | F21S 48/1233 |
| | | | | 362/552 |
| 7,611,272 B2 | 11/2009 | Specht et al. | | |
| 8,480,266 B2 | 7/2013 | Futami | | |
| 9,689,545 B2 * | 6/2017 | Wintzer | ................ | C03B 11/082 |
| 2006/0067090 A1 * | 3/2006 | Lee | ................ | F21V 7/0091 |
| | | | | 362/615 |
| 2008/0080201 A1 | 4/2008 | Specht et al. | | |
| 2008/0253144 A1 * | 10/2008 | Dolson | ................ | B60Q 1/0041 |
| | | | | 362/547 |
| 2010/0246200 A1 * | 9/2010 | Tessnow | ............ | F21S 48/2237 |
| | | | | 362/509 |
| 2011/0216549 A1 | 9/2011 | Futami | | |
| 2012/0147621 A1 * | 6/2012 | Holten | ............ | F21V 5/00 |
| | | | | 362/551 |
| 2015/0153019 A1 * | 6/2015 | Yoshizumi | ............ | G02B 6/0096 |
| | | | | 362/555 |
| 2015/0226395 A1 * | 8/2015 | Taudt | .................. | F21S 48/1154 |
| | | | | 362/511 |

* cited by examiner

VEHICLE LIGHTING DEVICE WITH OPTICAL WAVEGUIDES

CROSS-REFERENCE TO RELATED APPLICATIONS

This application claims priority to the French application 1552071 filed on Mar. 13, 2015, which application is incorporated herein by reference and made a part hereof.

BACKGROUND OF THE INVENTION

1. Field of the Invention

The invention concerns the field of lighting and/or signaling, notably for motor vehicles. It more particularly concerns a lighting device with optical waveguides adapted to be installed in a headlight lighting module.

2. Description of the Related Art

A motor vehicle is equipped with headlights, or headlamps, intended to illuminate the road in front of the vehicle, at night or under low light conditions, by means of an overall light beam. These headlights, a left-hand headlight and a right-hand headlight, include one or more lighting modules each adapted to generate and to direct an intermediate light beam the combination of which forms the overall light beam.

These headlights can generally be used in two lighting modes: a first or "high beam" mode and a second or "low beam" mode. The "high beam" mode enables the road to be strongly lit to a great distance in front of the vehicle. The "low beam" mode produces more limited lighting of the road, although nevertheless offering good vision, without dazzling other road users. The two lighting modes, "high beam" and "low beam", are complementary and a change is made from one to the other as a function of traffic conditions. Switching from one mode to the other may be effected manually, the driver deciding when to switch over, or automatically, as a function of the detection by appropriate means of conditions requiring such a change of lighting mode.

There nevertheless exists a requirement, in the motor vehicle field, to be able to illuminate the road ahead in "partial road lighting mode", namely to generate in a high beam one or more shadow regions corresponding to the locations of vehicles approaching in the opposite direction or vehicles travelling in front, so as to avoid dazzling other drivers at the same time as illuminating the greatest possible area of the road. Such a function is referred to as an adaptive driving beam (ADB) or "selective beam" function. This kind of ADB function consists on the one hand in automatically detecting a road user liable to be dazzled by a lighting beam emitted by a headlight in high beam mode and on the other hand to modify the contour of this lighting beam so as to create a shadow region at the location of the road user who has been detected. The ADB function has multiple advantages: user friendliness, improved vision compared to lighting in low beam mode, improved reliability for the change of mode, greatly reduced risk of dazzle, safer driving.

Selective beam producing lighting modules are known in which optical waveguides are disposed side-by-side, each being illuminated by a respective light source so that the light beam at the exit of the module is divided into contiguous segments that can be turned on or turned off as a function of instructions resulting from the detection of a nearby vehicle.

The shape and the arrangement of the waveguides relative to one another in a module of a headlight must be very accurate, on the one hand to be able to produce a smoothly homogeneous intermediate beam at the exit from the module when all the segments are turned on and on the other hand to be able to offer an intermediate beam complementary to the intermediate beam produced exiting the other headlight.

SUMMARY OF THE INVENTION

An objective of the invention is to propose a lighting device that enables the simple and effective implementation of a matrix lighting function and the lighting and/or signaling functions of which offer at least the same performance as before, at lower cost. To this end, the invention consists in a lighting device including a series, for example a transverse series, of optical waveguides, each optical waveguide being adapted to enable light rays to be guided between a light entry face and a light exit face. In accordance with the invention, the lighting device is formed of at least two subassemblies produced separately and each including a portion of the series of optical waveguides and structural elements for retaining the optical waveguides in position, the two subassemblies being adapted to be assembled to form the lighting device by cooperation of the structural elements.

In accordance with one particular feature of the invention, the optical waveguides are disposed so that the respective distal ends carrying the light exit face of two adjacent optical waveguides are in contact with each other and so that the respective proximal ends carrying the light entry face of these two adjacent optical waveguides are transversely spaced from each other. Clearly, on the one hand the proximal ends of the optical waveguides must be spaced so that the light emitted by one light source toward one optical waveguide does not enter the adjacent optical waveguide and on the other hand the distal ends of the optical waveguides must be stuck to one another successively to avoid shadow regions between the light segments formed by the optical waveguides and projected toward the projection device at the exit of the module.

Within this fan shape, the distal ends of the adjacent optical waveguides may be pressed against one another over a particular overlap portion, which may notably assume a value substantially equal to 1 mm. The transverse spacing of the proximal ends of the two adjacent optical waveguides may be less than or equal to 5 mm.

The optical waveguides are transversely distributed on either side of a central waveguide. In this case it is beneficial for the distal end of the optical waveguides disposed on one side of the central waveguide to have a height less than that of the distal end of the waveguides disposed on the other side of the central waveguide. In this case the central waveguide has a light exit face adapted to feature a lateral edge the height of which corresponds to that of the distal end of the optical waveguides disposed on one side of the central waveguide, another lateral edge the height of which corresponds to that of the distal end of the optical waveguides disposed on the other side of the central waveguide, and an upper edge connecting the two lateral edges and featuring a step, for example a vertical or oblique step. It is therefore possible to adapt to the shape of a shield disposed in the lighting module in which the lighting device is installed to form a cut-off edge of a "high beam" type beam.

In accordance with the features of one particular embodiment of the invention, considered separately or in combination, the lighting device is formed of two subassemblies carrying each of the optical waveguides of the series and at least one structural element. The first subassembly and the second subassembly comprise different numbers of optical waveguides.

The lighting device may include five optical waveguides comprising a central waveguide, two intermediate waveguides disposed in the direct vicinity of the central waveguide on either side thereof, and two lateral waveguides disposed at the ends of the series, and in this context the first subassembly may include the central waveguide and the lateral waveguides while the second subassembly includes the intermediate waveguides. Clearly there could then be a different number of optical waveguides, for example seven or nine optical waveguides, the width of which could be adapted and reduced. Note that the number of optical waveguides of the lighting device is advantageously odd to preserve this arrangement in which a central waveguide is carried by the first subassembly, intermediate waveguides are arranged in pairs on either side of the central waveguide, and two lateral waveguides are carried by the same subassembly, namely the first one or the second one, depending on the number of intermediate waveguides. The lighting device could equally not include any intermediate waveguides, the number of optical waveguides then being equal to three, with the central waveguide carried by the first subassembly and the lateral waveguide carried by the second subassembly.

In accordance with features specific to the composition of the structural elements:

the structural element of the second subassembly may be in the shape of a bearing strip positioned against the proximal end of the optical waveguides, the bearing strip including notches for positioning the optical waveguides carried by the first subassembly relative to the optical waveguides attached to the bearing strip; the notches could be replaced by openings within the thickness of the bearing strip, the role of positioning the optical waveguides remaining the same; moreover, at the level of these notches or these openings, the bearing strip may widen longitudinally to form an edge bearing against the optical waveguides, this bearing strip including at its transverse ends lugs for fixing the lighting module to the structure;

the first subassembly may include a first structural element adapted to connect the proximal ends of the optical waveguides and may further include a separate second structural element adapted to connect the distal ends of the optical waveguides and not impeding the propagation of light rays in the direction of the projection device at the exit of the lighting module;

the first structural element may include arches connecting the optical waveguides of the first subassembly one-by-one and adapted to overlap the proximal end of the optical waveguides carried by the second subassembly;

the second structural element may consist of a bearing strip disposed transversely to the light exit faces, on the downstream side of the light exit faces on the path of the light rays, made of translucent or transparent material, against which the light exit faces of the optical waveguides of the second subassembly come to bear; the light exit faces of the optical waveguides of the second subassembly may be stuck to the bearing strip; moreover, the bearing strip may be made in one piece with the optical waveguides of the first subassembly or be produced by an overmolding process, for example;

the structural element of at least one subassembly may carry means adapted to cooperate with a support plate to fix the lighting device into a lighting module; this plate may include two transverse uprights and two lateral fixing lugs adapted to be mounted on the structure of the lighting module to position the lighting device at the required location in the lighting module, while the transverse uprights make it possible to support each of the proximal and distal ends of the optical waveguides.

In accordance with other features of the invention, considered separately or in combination, each optical waveguide further includes a lower face and an upper face that extend between the ends of the light entry face and the light exit face, the lower face being a reflection face. This lower face may have a substantially elliptical shape a first focus of which coincides with the location of a source emitting light rays disposed at the level of the light entry face of the optical waveguide and a second focus of which is situated at the level of the light exit face. The second focus of the lower face may be situated at the level of the edge joining the upper face and the light exit face.

The subassemblies or at least the optical waveguides of the subassemblies, or even the subassemblies, are made from a material enabling the propagation of the light rays by total internal reflection from the entry face toward the light exit face, for example polycarbonate (PC) or polymethyl methacrylate (PMMA) or silicone or glass.

The invention also concerns a lighting module for a motor vehicle lighting and/or signaling device in which there are provided at least first means including a lighting device as just described above to participate in the production of a plurality of light segments that can be activated selectively.

In one particular application of the lighting device of the invention, the lighting module may include second means adapted to produce a first cut-off beam directed toward a projection device arranged at the exit of the module, the light segments produced by the first means forming a second beam directed toward the projection device and complementary to the cut-off beam when they are activated simultaneously.

The second means may notably consist in a first sub-module adapted to produce a low beam, notably having an oblique cut-off portion. The projection device may be a lens but could moreover take other known forms.

It is notable that the second means include, for the production of the cut-off beam, at least one reflector, a light source disposed at the level of a focus of the reflector and a shield, disposed on the path of the light rays from the light source reflected by the reflector and that the optical waveguides of the lighting device are disposed so as to be in contact with the shield. The optical waveguides may be oriented so as to be in contact with the shield only in the vicinity of the focal area of the projection device.

In accordance with one feature of the invention, the first means include a plurality of light sources, each light source being associated with an optical waveguide of a group of optical waveguides of the lighting device, and the number of optical waveguides of the group is less than or equal to the number of optical waveguides of the lighting device. In a preferred embodiment the number of optical waveguides of the group of optical waveguides may be strictly less than the number of optical waveguides of the lighting device.

Each light source is advantageously disposed at the level of the light entry face of the associated optical waveguide, for example at the first focus of the reflection face. The group of optical waveguides more advantageously comprises only the central waveguide and the optical waveguides situated on one side of the central waveguide.

The invention also concerns a lighting system for a motor vehicle, comprising at least one lighting module as described above and control means for turning on, turning off or modifying the luminous power emitted by the first means and the second means of the lighting module.

A module could also be provided to detect a body on the road that is not to be dazzled. This detection module may for example consist in a video camera facing the road in front of the vehicle and associated image processing means that make it possible to generate detection information that the detection module is adapted to send to the control means for turning on, turning off or modifying the luminous power emitted by each light source as a function of that detection information.

It is advantageous to provide a lighting system in which at least one module in accordance with the invention is disposed in a left-hand headlight and at least one other module in accordance with the invention is disposed in a right-hand headlight. The module disposed in the left-hand headlight includes a lighting device with a first subassembly of optical waveguides of a first type and a second subassembly of optical waveguides of a second type and the module disposed in the right-hand headlight includes a second lighting device with a first subassembly of optical waveguides of a third type and a second subassembly of optical waveguides of a second type, similar to the second subassembly of the first lighting device.

The modules may be arranged relative to one another, either within the same headlight or between the two headlights, so that at least a beam portion, for example a segment, produced by one of the modules overlaps at least a beam portion, in the example a segment, produced by another of the modules.

These and other objects and advantages of the invention will be apparent from the following description, the accompanying drawings and the appended claims.

BRIEF DESCRIPTION OF THE ACCOMPANYING DRAWINGS

Other features and advantages of the present invention will become more clearly apparent in the light of the description and the drawings, in which.

DETAILED DESCRIPTION OF THE PREFERRED EMBODIMENTS

The lighting device in accordance with the invention will be described first, notably with the aid of FIGS. 1 to 3, in which it is apparent that the lighting device 1 is formed of two distinct subassemblies 2 and 4 that are assembled together.

Figure 1:
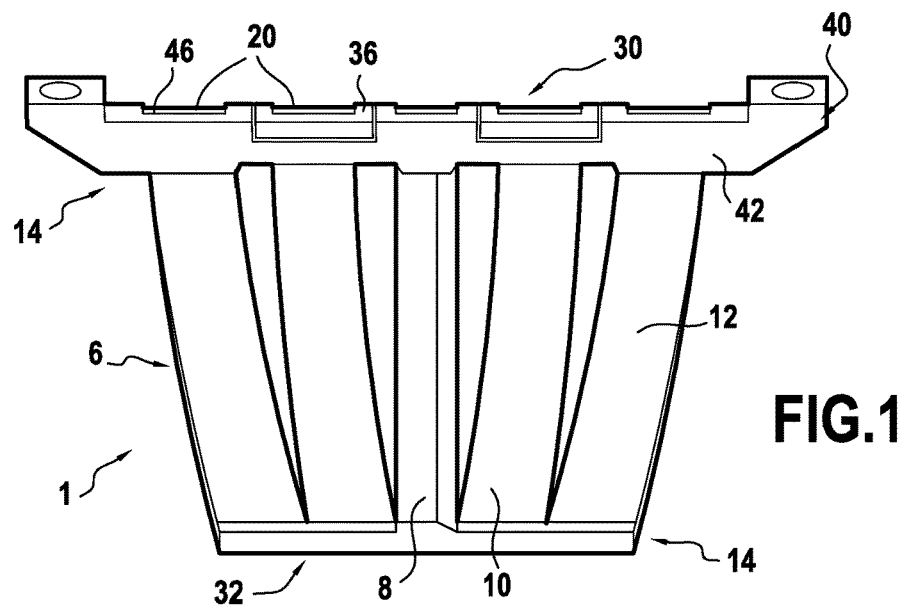
FIG. 1 is a perspective view of a lighting device in accordance with the invention.

Here the assembled lighting device 1, seen in FIG. 1, includes five optical waveguides 6 comprising a central waveguide 8, two intermediate waveguides 10 and two lateral waveguides 12 arranged transversely in series so that there are found in succession the lateral waveguide 12, the intermediate waveguide 10, the central waveguide 8, the intermediate waveguide 10 and the lateral waveguide 12. The lighting device 1 also includes structural elements 14 for holding the optical waveguides 6 in position, which on the one hand connect together the corresponding proximal ends 16 of the optical waveguides 6 and on the other hand connect together the corresponding distal ends 18 of the optical waveguides 6.

Each optical waveguide 6 is adapted to guide by total internal reflection light rays emitted by a light source associated with the optical waveguide 6 to direct them on leaving the optical waveguide 6 toward a lens type projection device. To this end, each optical waveguide 6 has a light entry face 20 at the proximal end 16 of the optical waveguide 6 and a light exit face 22 at the distal end 18, as well as a lower face, referred to as the reflection face 24, and an upper face, referred to as the front face 26, that extend between the ends of the light entry face 20 and the light exit face 22.

The height of an optical waveguide 6 is arbitrarily defined as the dimension between the reflection face 24 and the front face 26 (both visible in FIG. 4), in a vertical direction, the length of the optical waveguide 6 is defined as the dimension between the light entry face 20 and the light exit face 22 in a longitudinal direction, and the width of the optical waveguide 6 corresponds to the dimension in the transverse direction in which the optical waveguides 6 are in series.

Figure 4:
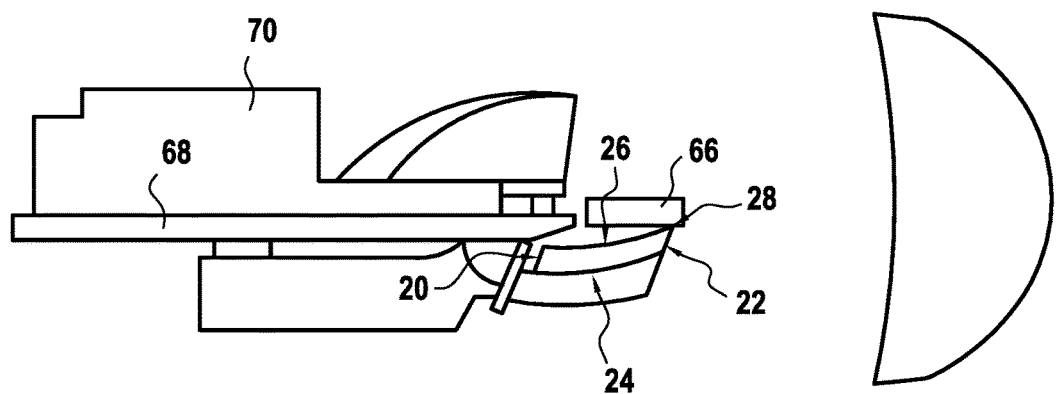
FIG. 4 is a general view of a lighting module for a motor vehicle headlight in which the lighting device from FIG. 1 has been used.

In the example shown, and as notably can be seen in FIG. 4, the reflection face 24 has a substantially elliptical shape a first focus of which coincides with the location of the light source and a second focus of which, referred to as the focusing focus, is situated at the level of an edge 28 joining the front face 26 and the light exit face 22 so that the light rays reflected in each optical waveguide 6 exit the optical waveguide 6 primarily at the top of the light exit face 22.

The lighting device 1 has a substantially symmetrical layout on either side of the central waveguide 8, except for the height of each symmetrical portion. The height of the optical waveguides 6 is different according to whether the optical waveguides 6 are disposed on one side or the other of the central waveguide 8, and the central waveguide 8 has the light exit face 22 with the edge 28 joining it to the front face 26 cropped to feature a vertical or oblique step so as substantially to form a staircase step. As shown in the figures, the intermediate and lateral waveguides 10, 12 disposed to the right of the central waveguide 8, when viewing the lighting device 1 facing the light exit faces 22 of the intermediate and lateral waveguides 10, 12, have a height less than that of the intermediate and lateral waveguides 10, 12 disposed on the left of the central waveguide 8. In other words, the central waveguide 8 has a light exit face 22 adapted to have a lateral edge, the height of which corresponds to that of the distal end of the intermediate and lateral waveguides 10, 12 disposed on one side of the central waveguide 8, another lateral edge, the height of which corresponds this time to that of the distal end of the intermediate and lateral waveguides 10, 12 disposed on the other side of the central waveguide 8, and an upper edge connecting the two lateral edges and including the step.

The optical waveguides 6 are disposed and held in position by the structural elements 14 so as to be in transverse series, in a fan arrangement. By a fan arrangement of the optical waveguides 6 of the lighting device 1 is meant an arrangement in which the respective distal ends 18 of the optical waveguides 6 carrying the light exit faces 22 are stuck together and in which the respective proximal ends 16 carrying the light entry faces 20 facing the light sources are spaced transversely from one another. The proximal ends 16 must be spaced so that the light emitted by a light source toward one optical waveguide 6 does not enter the adjacent optical waveguide 6 and the distal ends of the optical waveguides 6 must be stuck successively to one another to prevent shadow regions between the light segments formed by the optical waveguides 6 and projected toward the projection device at the exit from the module. As shown, it is advantageous for the distal ends 18 of the optical waveguides 6 to be pressed together over a particular distance, which may be approximately 1 mm, for example, to form an overlapping portion of the light segments and to ensure continuous illumination when all the segments are lit.

Structural elements 14 retain the optical waveguides 6 between them and some cooperate between them in the vicinity of the proximal end 16 of the optical waveguides 6 and second structural elements 14 take the form of plates against which the light exit faces 22 of the optical waveguides 6 bear longitudinally. It is seen that these second structural elements 14 contribute to the overlapping of the distal ends 18 of the optical waveguides 6.

In accordance with the invention, the lighting device 1 is therefore formed of two distinct subassemblies that have been assembled one against the other.

Figure 2:
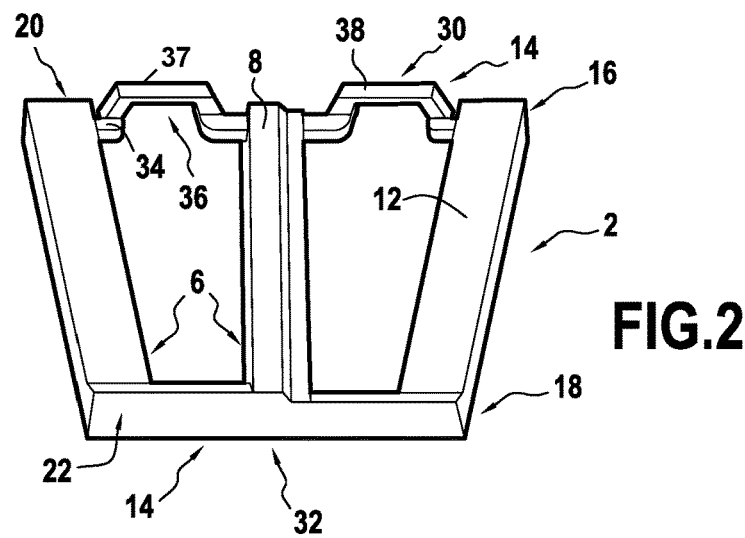
FIGS. 2 and 3 are perspective views of the two subassemblies forming the lighting device from FIG. 1.

Here a first subassembly 2, shown in FIG. 2, includes three optical waveguides 6 disposed in transverse series and spaced from one another and structural elements 14 connecting the corresponding ends of these optical waveguides 6. Here the first subassembly 2 carries the central waveguide 8 and the lateral waveguides 12 spaced from the central waveguide 8 at their distal end 18 by a distance substantially equal to the width of the intermediate waveguide 10 that is to be placed between them on assembling the two subassemblies 2, 4.

The first subassembly 2 includes first structural elements 30 disposed between the proximal ends 16 of the optical waveguides 6 and second structural elements 32 disposed between the distal ends 18 of the optical waveguides 6. As can be seen in FIG. 2, in particular, the first structural elements 14 include fingers 34 transversely extending the proximal ends 16 of the optical waveguides 6 in the direction towards the adjacent optical waveguide 6 and arches 36 that extend between two facing fingers 34 and form a step substantially in the heightwise direction, that is to say in the direction perpendicular to the transverse direction of the series of optical waveguides 6 and to the principal longitudinal direction of the optical waveguides 6. The arches 36 are substantially inclined toward the optical waveguides 6 and their distal end 18 so that an upper portion 37 of the arch 36 is closed at least in part above the fingers 34.

The second structural elements 14 take the form of two plates 38 disposed on either side of the central waveguide 8 and transversely extending the distal end 18 of the central waveguide 8 so as to overlap the light exit faces 22 of the lateral waveguides 12. The plates 38 extend parallel to the planes defined by the light exit faces 22 of the optical waveguides 6 and do not impede the propagation of the light rays in the direction of the lens at the exit from the module.

Figure 3:
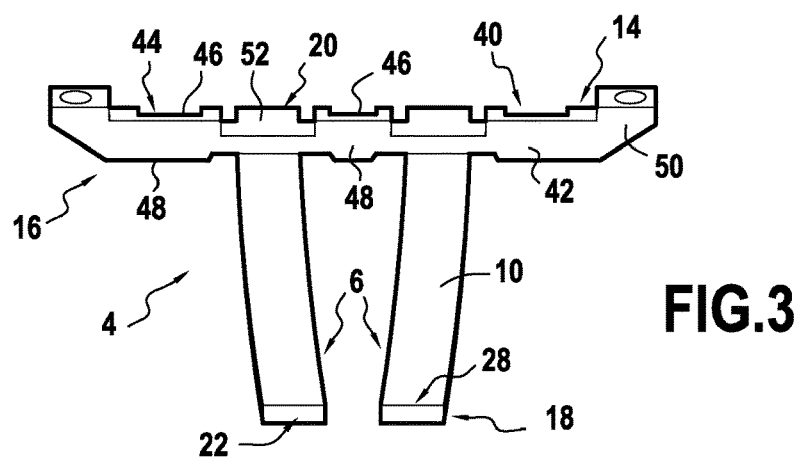

Here a second subassembly 4, seen in FIG. 3, includes two optical waveguides 6 disposed in transverse series and spaced from each other and a structural element 14 connecting one of the ends of each of the optical waveguides 6. Here the second subassemblies 4 carries the intermediate waveguides 10 spaced from each other at their distal end 18 by a distance substantially equal to the width of the central waveguide 8 to be placed between them on assembling the two subassemblies 2, 4.

The second subassembly 4 includes third structural elements 40 disposed at the level of the proximal ends 16 of the optical waveguides 6 and includes a transverse bearing strip 42 disposed against the front face 26 of the optical waveguides 6. This bearing strip 42 has a front face and a rear face 44 facing the front face 26 of the optical waveguide 6. The rear face 44 features three notches 46 that extend the full height of the bearing strip 42, over a width substantially equal to and slightly greater than the width of the lateral waveguides 12 and the central waveguide 8 carried by the first subassembly 2. As will be described hereinafter, the notches 46 correspond to housings of the optical waveguides 6 mounted against the bearing strip 42 by assembling the first subassembly 2. At the level of these notches 46, the bearing strip 42 is widened longitudinally to form an edge 48 bearing against the optical waveguides 6. The bearing strip 42 includes fixing lugs 50 at its transverse ends.

At the level of the intermediate waveguides 10 made in one piece with the bearing strip 42, the latter features a step 52 forming a surface receiving the arch 36 when the two subassemblies 2, 4 are assembled, the light entry face 20 of the intermediate waveguide 10 coming to be accommodated in the arch 36 of the first subassembly 2.

Each of the subassemblies 2, 4 is produced individually by a molding process and they are then assembled relative to one another by virtue of cooperation of the structural elements 14. Here the optical waveguides 6 are pre-held relative to one another with their distal ends 18 in contact with the distal end 18 of the adjacent optical waveguide 6 and the spacing of the optical waveguides 6 relative to their neighbor or neighbors at the level of their proximal ends 16, corresponding to their light entry face 20, is produced by virtue of the proximal end 16 of the optical waveguides 6 of the first subassembly 2 being accommodated in the notches 46 provided for this purpose in the second subassembly 4 and by virtue of the proximal end 16 of the optical waveguides 6 of the second subassembly 4 being accommodated in the arches 36 provided for this purpose in the first subassembly 2.

Clearly, by modifying the number of intermediate waveguides 10, the arrangement of the lighting device 1 with a central waveguide 8, two lateral waveguides 12 and intermediate waveguides 10 could be obtained with a number of optical waveguides 6 other than five as described until now. There could then be seven or nine optical waveguides 6, for example, the width of which could be adapted and reduced. In the case of a lighting device 1 with seven optical waveguides 6 in series, the first subassembly 2 would include the central waveguide 8 and two first intermediate waveguides 10, spaced from one another by an interval making it possible to accommodate an intermediate waveguide 10 carried by the second subassembly 4, which for its part would include two second intermediate waveguides 10 and the two lateral waveguides 12. Note that the number of optical waveguides 6 of the lighting device 1 is advantageously odd to preserve this arrangement whereby a central waveguide 8 is carried by the first subassembly 2, intermediate waveguides 10 are arranged in pairs on either side of the central waveguide 8, and two lateral waveguides 12 are carried by the same subassembly 2 or 4, namely the first one or the second one according to the number of intermediate waveguides 10. The lighting device 1 could also include no intermediate waveguides 10, the number of optical waveguides 6 then being equal to three, with the central waveguide 8 carried by the first subassembly 2 and the lateral waveguides 12 carried by the second subassembly 4.

Clearly, to enable the guiding of the light rays inside the optical waveguides 6, each subassembly 2, 4 is produced in a material enabling guiding of the light rays by total internal reflection from the light entry face 20 toward the light exit face 22. Such a material could consist of polycarbonate (PC), polymethyl methacrylate (PMMA), silicone or glass, for example. Here each subassembly 2, 4 is produced by an operation of molding the optical waveguides 6 and the structural elements 14. The shape of the subassemblies 2, 4 and the spacing between the optical waveguides 6 of the same subassembly facilitate extraction from the mold.

Figure 5:
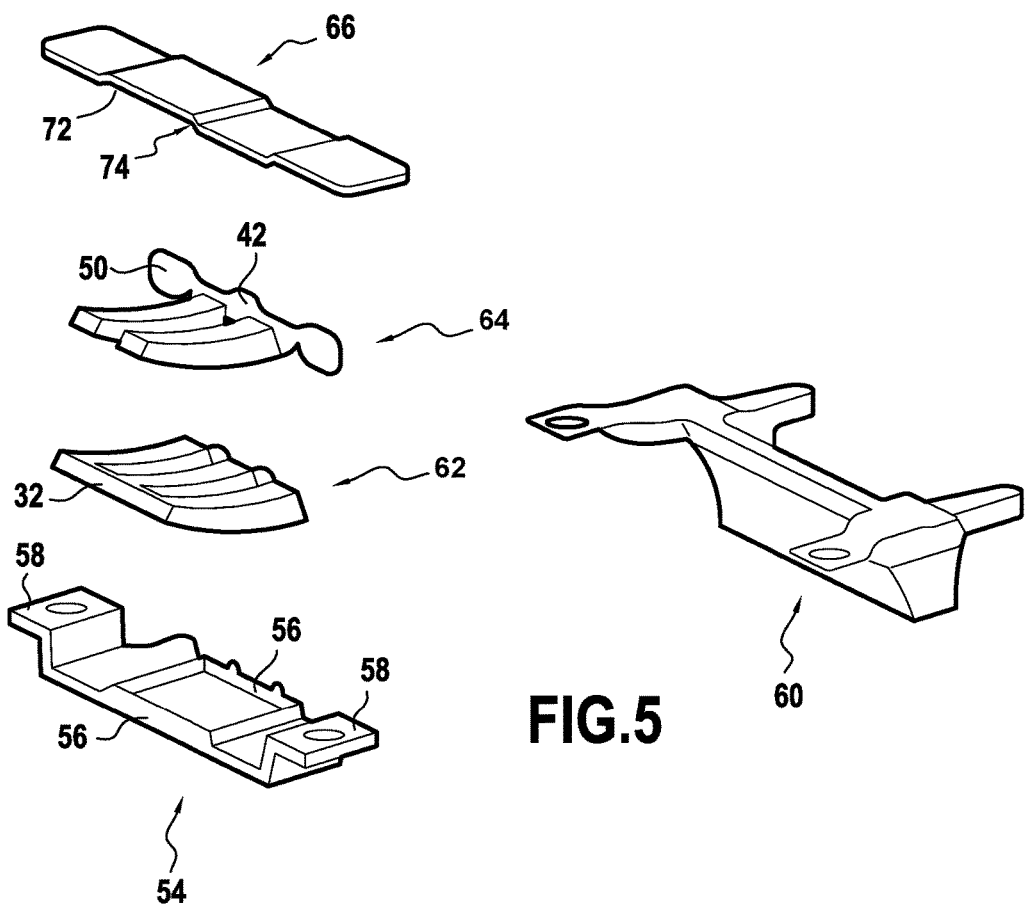
FIG. 5 is an exploded perspective view of the subassemblies of the lighting device and the support means for fixing it into the lighting module from FIG. 4.

As shown in FIG. 5, the lighting device 1 created by assembling the two subassemblies 2, 4 is then fixed into the lighting module by a fixing support 54 that takes the form of a transverse plate including two transverse uprights 56 and two lateral fixing lugs 58. These fixing lugs 58 are adapted to be mounted on the structure 60 of the module and to locate the lighting device 1 at the required location in the module and the transverse uprights 56 are for supporting each of the proximal ends 16 and distal ends 18 of the optical waveguides 6. Clearly, the optical waveguides 6 are held in place relative to one another by virtue of the presence of the structural elements 14 of each subassembly 2, 4 of the lighting device 1 of the invention and their cooperation and all of the optical waveguides 6 are held in place relative to the module by virtue of the presence of this fixing support 54.

There is shown in FIG. 4 a lighting module in which the lighting device 1 that has just been described is installed. The lighting module is a so-called dual function module, that is to say a module in which two sub-modules 62, 64 (FIG. 5) are arranged one against the other to provide a "high beam" function and a complementary "low beam" function by projection of light beams toward a lens-type optical projection device disposed at the exit of the lighting module.

The lighting module is included in a lighting system that also includes control means for turning on, turning off or modifying the luminous power emitted by each light source of each of the two sub-modules 62, 64. These control means could be specific to each sub-module 62 or 64 or consist in single control means if each light source of the system can be controlled simultaneously. The lighting system further includes a detection module for detecting a body on the road that is not to be dazzled. This detection module consists, for example, of a video camera facing the road in front of the vehicle and associated image processing means that make it possible to generate detection information that the detection module is adapted to send to the control means to turn on, turn off or modify the luminous power emitted by each light source as a function of this detection information.

It is particularly beneficial to propose a lighting system comprising at least two lighting modules such as might be described here. These lighting modules are arranged so that at least one of the lighting modules is disposed in a left-hand headlight of the vehicle and at least one of the lighting modules is disposed in the corresponding right-hand headlight. A plurality of lighting modules could be provided in each headlight. The lighting modules are arranged relative to one another, either in the same headlight or between the two headlights, so that at least one beam portion, for example a segment, produced by one of the lighting modules overlaps at least a beam portion, in the present example a segment, produced by another of the lighting modules.

In at least one lighting module of each headlight formed of two sub-modules 62, 64, the first sub-module 62 is adapted to produce a first cut-off beam, to provide the "low beam" function, and the second sub-module 64 is adapted to produce a second beam complementary to the first beam so that these two beams when superposed together produce the "high beam" function. By complementary beam is meant a beam that with the beam produced by the first sub-module 62 produces a coherent beam when the two sub-modules 62, 64 are controlled to emit simultaneously the light beam that is specific to them.

The lighting module includes a shield 66 and a support plate 68 that lie substantially in the median plane of the lighting module, between the two sub-modules 62, 64, the shield notably extending along the path of the rays reflected by the first sub-module 62 to produce in a known manner the cut-off of the first beam and the support plate 68 carries the two sub-modules 62, 64 and their respective light sources together with means 70 for cooling everything. The shield 66 has a cut-off edge 72 that has a curved profile, notably including an inclined plane 74, for example a step shape substantially at the center of the cut-off edge 72. The central reflection area is therefore composed of two distinct parts offset vertically relative to each other, an inclined plane, for example inclined at 15° or 45°, connecting them to form the step.

The complementary beam from the second sub-module 64 is a selective beam making it possible to produce a non-dazzling high beam with a beam divided into several portions that can be turned on or off selectively in accordance with the instructions controlling the light sources associated with the second sub-module 64. The lighting function produced by each beam portion can be turned off or attenuated in order to form an area that does not dazzle a vehicle driver detected in the road view on the upstream side of the vehicle at the same time as making it possible to preserve good lighting conditions for the remainder of the road view.

The second sub-module 64 notably includes on the one hand a plurality of light sources that can be activated selectively to emit light rays simultaneously or alternately and on the other hand the lighting device 1 described above and composed of a plurality of optical waveguides 6. The lighting device 1 and the diodes are positioned relative to one another so that each source is adapted to cooperate with one of the optical waveguides 6 to form images of those sources at the level of the focal plane P of the projection optical device in order for these images to be projected by the projection device at the exit of the lighting module. Each beam portion is produced by the cooperation of a light source and an associated optical waveguide 6 and here these beam portions take the form of straight rectilinear strips corresponding to the shapes of the light exit faces 22 of the optical waveguides 6 of the lighting device 1.

Figure 6:
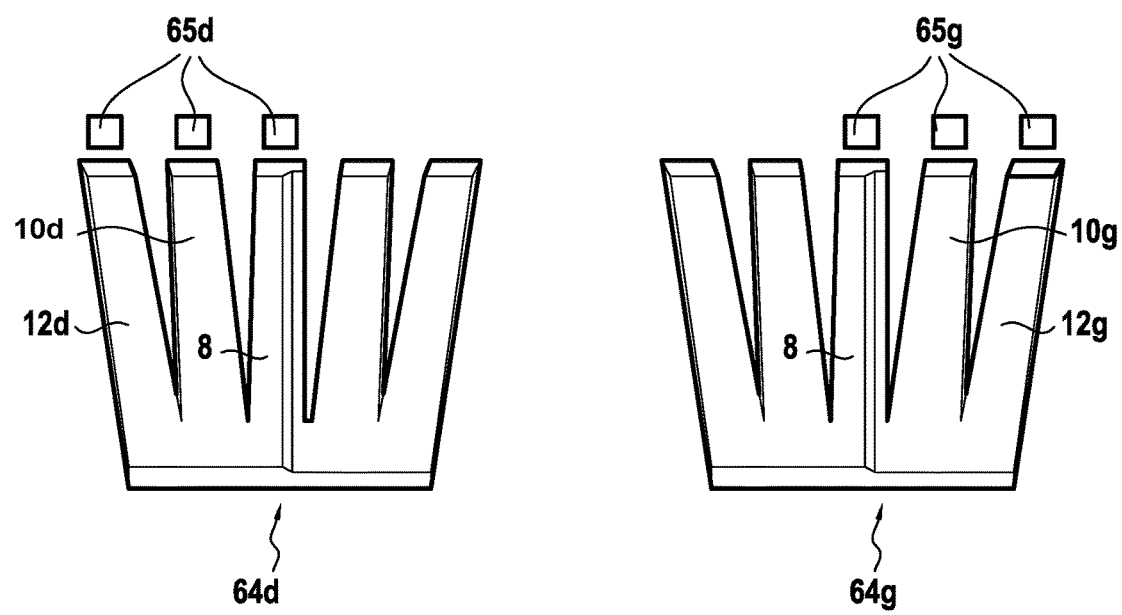
FIG. 6 shows a preferred embodiment of the invention in which the lighting device is standardized for left-hand and right-hand lighting modules, which differ in the location of the light sources associated with the lighting devices.

In FIG. 6 there is shown a preferred embodiment of the invention in which the lighting device 1 includes a number of optical waveguides 6, here five of them, greater than the number of light sources 65, here three of them. The result is to produce the same standard assembly that can be used on the left-hand side or on the right-hand side, producing a number of segments less than the number of optical waveguides 6. In a left-hand sub-module 64*g* associated with a left-hand module, the three light sources 65*g* are disposed facing the central waveguide 8, a left-hand intermediate waveguide 10g and a lateral waveguide 12g, and in the right-hand sub-module 64d associated with a right-hand module, the three light sources 65d are disposed facing the central waveguide 8, a right-hand intermediate waveguide 10d and a lateral waveguide 12d.

It is clear that, in this situation where the number of light sources 65 is less than the number of optical waveguides 6 and the location of the light sources 65 relative to the lighting device 1 differs according to whether this refers to a left-hand sub-module 64g or right-hand sub-module 64d, it is important that the light sources 65 associated with a sub-module 64g or 64d face optical waveguides 6 the height of which is greater than that of the others and that the light sources 65 associated with the other sub-module 64g or 64d face optical waveguides 6 the height of which is less than that of the others. From one sub-module 64g or 64d to the other, the light sources 65 are disposed symmetrically with respect to the vertical median plane of the vehicle, and advantageously toward the exterior of the vehicle.

In a variant that is not shown, the number of light sources 65 could be equal to the number of optical waveguides 6 of the lighting device 1, it being understood that in this variant it remains advantageous to standardize the lighting device 1 in the left-hand module 64g and the right-hand module 64d. The number of segments is then equal to the number of optical waveguides 6.

The lighting device 1 in accordance with the invention is arranged in the second sub-module 64. The light exit faces 22 of the optical waveguides 6 face toward the lens and the light entry faces 20 face toward a structural element 14 on which the light sources 65 are mounted so that they face the light entry face 20 of the corresponding optical waveguide 6. Moreover, the reflection face 24 faces away from the shield 66 and the front face 26 faces toward the shield 66. The lighting device 1 is arranged in the module so that the optical waveguides 6 are in contact with the shield 66 only in the vicinity of the focal plane of the lens. It is the front face 26 of each optical waveguide 6 that is in contact with the shield 66, the line of contact between each front face 26 and the shield 66 being in the focal plane of the lens.

This arrangement and the substantially elliptical shape of the reflection face 24 of each optical waveguide 6, as described above, makes it possible for the light rays to exit the optical waveguide 6 at the top of the light exit face 22, to ensure that some of these rays reach the lens directly in the upper portion and others are reflected by a lower face of the shield 66 to reach the lower portion of the lens.

Moreover, the areas of overlap of the images, formed by virtue of the fact that the distal ends 18 of the optical waveguides 6 are pressed against one another over a particular portion, are disposed on the upstream side of the focal plane of the lens, which makes it possible to project a complementary beam the various portions of which are smoothed to prevent a vertical cut-off that is too sharp in the case of segmentation of the beam.

Each of the light sources 65 consists of a semiconductor source, for example a light-emitting diode fixed to a printed circuit board or mounted directly on structural elements of the lighting device 1. The light sources 65 are disposed in transverse series with a spacing between light sources 65 that may advantageously be between 5 and 10 mm and is substantially equal to the transverse spacing between two successive optical waveguide light entry faces 20 of the lighting device 1 so that each optical waveguide 6 is indeed disposed facing one of these light sources 65.

The series of optical waveguides 6 of the lighting device 1 is centered transversely in the module so that the central waveguide 8 and the upper edge of its distal end 18 cooperate with the inclined plane 74 of the shield 66. As a result, the intermediate waveguides 10 and the lateral waveguides 12 extend transversely on either side of this inclined plane of the shield 66. Given that the vehicle includes two headlights, one on the left-hand side and one on the right-hand side, the superposition of the left-hand and right-hand beams produces a complete complementary high beam in which each segment of the high beam can be strongly lit by turning on the corresponding two segments of the left-hand and right-hand beams, either partially by turning on the segment of one of the beams or by turning on the segment of the other beam, or turned off completely. Moreover, it is interesting to note that the lighting device 1 may in accordance with the invention be installed interchangeably in the lighting module of a left-hand headlight or in the lighting module of a right-hand headlight, which simplifies fitting the headlights.

In the example shown, there are five light sources 65 for a commensurate number of optical waveguides 6, but it will be clear that in accordance with the invention it is necessary for the number of light sources 65 and therefore of optical waveguides 6 to be odd and at least equal to three, subject to the reminder that the number of light sources 65 may be less than or equal to the number of optical waveguides 6. Clearly it is advantageous for the number of optical waveguides 6 to be odd so that they are distributed symmetrically around a central waveguide 8 cooperating with the inclined plane of the shield 66 and so the a lighting device 1 can therefore be proposed that can be produced and installed in a standard manner on a left-hand headlight module or a right-hand headlight module. It is also clear that the number must be strictly greater than one for the light sources 65 associated with each optical waveguide 6 and that can be selectively activated to be able to generate the formation of a complementary beam adapted to produce a non-dazzling high beam function in which one of the segments of the complementary beam can be turned off or attenuated in the event of detection of a vehicle in the area lit by that segment.

The foregoing description explains clearly how the invention makes it possible to achieve the objectives set for it and notably to propose a lighting device 1 that facilitates the design and the manufacture of a plurality of optical waveguides 6 and their incorporation into a module facing light sources to guide light rays and create an adaptive beam.

The lighting device 1 is particularly easy to produce by a molding process because of the design as two subassemblies 2, 4 in each of which large spaces are left between the optical waveguides 6 and because the obtuse angles make it possible to avoid creating areas of weakness. The tooling and the corresponding molds are therefore easier and less costly to design and losses in manufacture reduced.

The production of two subassemblies 2, 4 to form the optical waveguide assembly and the easy pre-assembly of the lighting device 1 through the cooperation of the structural elements 14 with each other facilitates the use for each lighting module of a lighting device 1 including optical waveguides 6 disposed substantially symmetrically with respect to the vertical median plane of the lighting module so that the same series of optical waveguides 6 can be used for a lighting module of a left-hand headlight and a lighting module of a right-hand headlight. This choice makes it possible to facilitate fitting and to prevent the risks of them being swapped over as it clearly can be difficult to identify correctly the assemblies produced for the left-hand and right-hand modules.

Moreover, the production of two distinct subassemblies 2, 4 of optical waveguides 6 makes it possible to facilitates standardization of some of the optical waveguides 6 from one motor vehicle to another or from one head-light to the other of the same vehicle. The same second subassembly 4 could be produced from one headlight to the other and a first subassembly 2 proposed, notably in terms of the shape of the central waveguide 8 and/or the lateral waveguides 12, which may be adapted to the shape of the associated lighting module. The lighting module disposed in the left-hand headlight could include a lighting device 1 in which the first subassembly 2 includes optical waveguides 6 of a first type and the second subassembly 4 includes optical waveguides 6 of a second type and a lighting module disposed in the right-hand headlight could at the same time include a lighting device 1 in which the first subassembly 2 includes optical waveguides 6 similar to or different from those of the first subassembly 2 of the left-hand headlight and in which the second subassembly 4 includes optical waveguides 6 of a type again similar to or different from those of the second subassembly 4 of the first lighting device 1.

Of course, various modifications may be made by the person skilled in the art to the structure of the lighting device 1 that has just been described by way of nonlimiting example, notably in terms of the number of optical waveguides 6 and the shape of the structural elements 14 of the subassemblies 2, 4, provided that the lighting device 1 includes in accordance with the invention a plurality of optical waveguides 6 carried by a plurality of subassemblies 2, 4. In any event, the invention should not be regarded as limited to the embodiments specifically described in this document and in particular embraces all equivalent means and any technically operative combination of those means.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A lighting device comprising:
   a series of optical waveguides, each optical waveguide being adapted to guide light rays between an entry face and an exit face, the optical waveguides being formed of a first subassembly and a second subassembly, produced separately and each including a portion of the series of optical waveguides and including structural elements to retain the optical waveguides in position, wherein
   the first subassembly and the second subassembly are adapted to be assembled to form the lighting device by cooperation of the structural elements, and
   the first subassembly includes a first structural element adapted to connect proximal ends of the optical waveguides and a second structural element distinct from the first structural element and adapted to connect distal ends of the optical waveguides, wherein
   the first structural element includes arches that transversely extend the proximal ends of the waveguides, and the second subassembly includes members featuring a step forming a surface receiving respective arches of the first structural element when the two subassemblies are assembled to form the lighting device.

2. The lighting device according to claim 1, wherein the series of optical waveguides includes five optical waveguides comprising a central optical waveguide, two intermediate optical waveguides immediately proximate the central optical waveguide on either side thereof, and two lateral optical waveguides disposed at opposite sides of the intermediate optical waveguides with respect to the central optical waveguide, and the first subassembly includes the central optical waveguide and the lateral optical waveguides, and the second subassembly includes the intermediate optical waveguides.

3. The lighting device according to claim 1, wherein the structural element of the second subassembly is shaped like a bearing strip formed in the second subassembly and positioned against the proximal end of the optical waveguides, the structural element including notches for positioning the optical waveguides carried by the first subassembly relative to the optical waveguides of the second subassembly.

4. The lighting device according to claim 1, wherein the optical waveguides are disposed so that the respective distal ends carrying the exit face of two adjacent optical waveguides are in contact with each other and so that the respective proximal ends carrying the entry face of these two adjacent optical waveguides are transversely spaced from each other.

5. The lighting device according to claim 4, wherein the distal ends of the adjacent optical waveguides at least partially overlap one another.

6. The lighting device according to claim 1, wherein the optical waveguides include a central optical waveguide and at least two other optical waveguides arranged on either side of the central optical waveguide.

7. The lighting device according to claim 6, wherein the distal end of the optical waveguides disposed on one side of the central optical waveguide has a height less than that of the distal end of the optical waveguides disposed on the other side of the central optical waveguide.

8. The lighting device according to claim 1, wherein the first structural element includes arches connecting the optical waveguides of the first subassembly one-by-one and adapted to come to overlap the proximal end of the optical waveguides carried of the second subassembly.

9. The lighting device according to claim 8, wherein the second structural element consists of a bearing strip made of a translucent or transparent material, and disposed transversely to the exit faces, against which the exit faces of the optical waveguides of the second subassembly come to bear.

10. A lighting module for a motor vehicle lighting and/or signaling device, comprising:
    a first device including at least one first light source; and
    the lighting device according to claim 1, wherein
    the first device and the lighting device cooperate to project a plurality of selectively activated light segments.

11. The lighting module according to claim 10, further comprising:
    a projection device arranged at the exit of the lighting module; and
    a second device including at least one second light source, and adapted to produce a first cut-off beam directed toward the projection device, wherein
    the light segments form a second beam directed toward the projection device, to complement the first cut-off beam when the first cut-off beam and the second beam are activated simultaneously.

12. A lighting system comprising at least one lighting module according to claim 11, further comprising a control device configured to turn on, turn off or adjust the luminous power emitted by the first and second light sources.

13. The lighting module according to claim 10, wherein the first device includes a plurality of first light sources, each of the plurality of first light sources being associated with one optical waveguide of the series of optical waveguides, a number of first light sources being less than or equal to a number of the series of optical waveguides.

14. The lighting module according to claim 13, wherein the number of first light sources is less than the number of the series of optical waveguides.

15. A lighting device comprising:
a series of optical waveguides, each optical waveguide being adapted to guide light rays between an entry face and an exit face, the optical waveguides being formed of a first subassembly and a second subassembly, produced separately and each including a portion of the series of optical waveguides and including structural elements to retain the optical waveguides in position, wherein the first subassembly and the second subassembly are adapted to be assembled to form the lighting device by cooperation of the structural elements, and the first subassembly includes a first structural element adapted to connect proximal ends of the optical waveguides and a second structural element distinct from the first structural element and adapted to connect distal ends of the optical waveguides, wherein the optical waveguides are disposed so that the respective distal ends carrying the exit face of two adjacent optical waveguides are in contact with each other and so that the respective proximal ends carrying the entry face of these two adjacent optical waveguides are transversely spaced from each other, and the distal ends of the adjacent optical waveguides at least partially overlap one another.

\* \* \* \* \*